INVENTOR.
FREDERICK E. KEISER

March 17, 1970    F. E. KEISER    3,500,695
TWIN COUNTERSHAFT TRANSMISSION IN WHICH THE MAIN SHAFT HAS
ONE END FLOATING AND THE OTHER END PIVOTED
Filed Aug. 23, 1968    3 Sheets-Sheet 2

INVENTOR.
FREDERICK E. KEISER
BY
Woodhams, Blanchard & Flynn
ATTORNEYS

March 17, 1970     F. E. KEISER     3,500,695
TWIN COUNTERSHAFT TRANSMISSION IN WHICH THE MAIN SHAFT HAS
ONE END FLOATING AND THE OTHER END PIVOTED
Filed Aug. 23, 1968     3 Sheets-Sheet 3
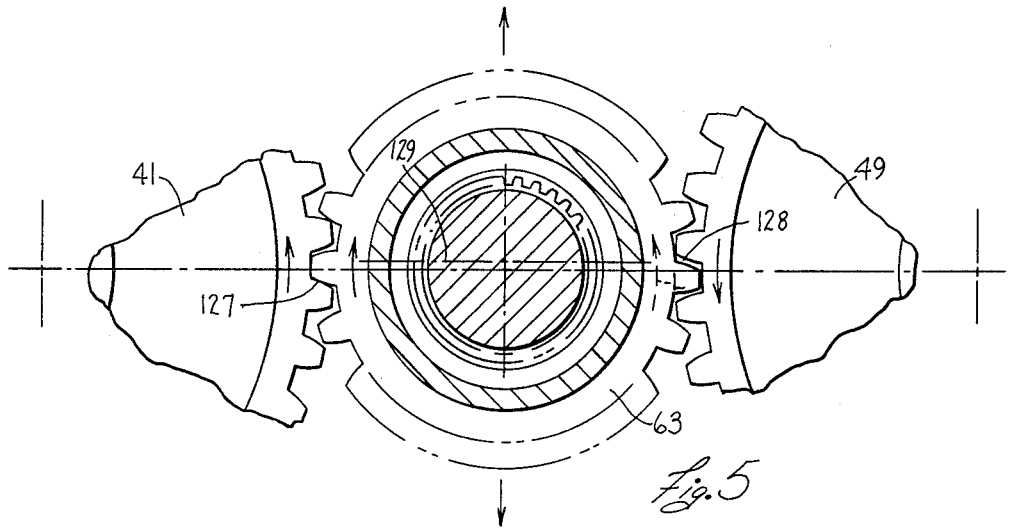
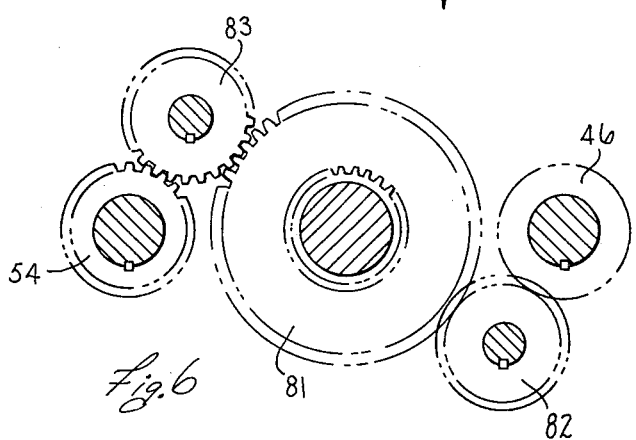
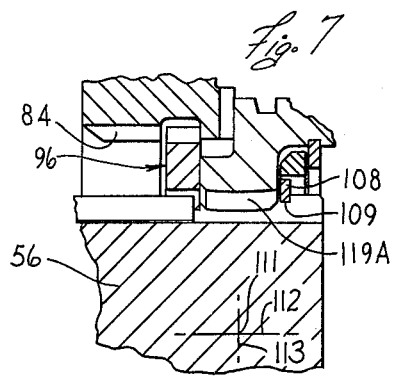
INVENTOR.
FREDERICK E. KEISER
BY
Woodhams, Blanchard & Flynn
ATTORNEYS

United States Patent Office 3,500,695
Patented Mar. 17, 1970

3,500,695
TWIN COUNTERSHAFT TRANSMISSION IN WHICH THE MAIN SHAFT HAS ONE END FLOATING AND THE OTHER END PIVOTED
Frederick E. Keiser, Vicksburg, Mich., assignor to Eaton Yale & Towne Inc., Cleveland, Ohio, a corporation of Ohio
Filed Aug. 23, 1968, Ser. No. 754,765
Int. Cl. F16h *3/08*
U.S. Cl. 74—331      13 Claims

ABSTRACT OF THE DISCLOSURE

A change gear system having a plurality of spaced countershafts having parallel axes and means supporting the countershafts for rotation. Countershaft gears are provided on the countershafts and are concentric and rotatable therewith. A rotatable main shaft is provided which is arranged substantially parallel with the countershafts and is preferably located between a pair of the countershafts. Means are provided for pivotally supporting one end of the main shaft in addition to means for guiding the other end thereof in a free floating relation relative to the one end for movement in at least a direction transverse of a plane through the axes of two of the countershafts. Clutching means are provided for effecting a driving connection between the countershafts and the main shaft.

FIELD OF THE INVENTION

This invention relates to a multicountershaft transmission and, more particularly, to a type thereof having provision for the equalizing of torque transmission through the countershafts.

BACKGROUND OF THE INVENTION

In Patent No. 3,105,395, issued Oct. 1, 1963, assigned to the same assignee as the present invention, there has been set forth a highly effective and commercially successful system for obtaining the recognized advantages of a multicountershaft transmission while maintaining in a very simple manner the equality of torque transmission through the said countershafts. The transmission set forth in this patent provides both an input shaft and the countershafts on fixed axes with the gears thereof being immovable radially with respect to the respective shafts on which they are mounted. The output shaft, however, or main shaft, is floatingly mounted for movement transverse to a plane through the axes of two countershafts and the main shaft gears when the main shaft gears are unclutched from the main shaft. The main shaft gears, which are supported on and by the countershaft gears, encircle the main shaft with sufficient clearance to permit movement of the main shaft radially with respect to the gears. Thus, the main shaft can move radially with respect to the gears to which it is not clutched but the gear to which said main shaft is clutched and said main shaft is radially movable as a single unit transversely with respect to the plane connecting the axes of the two countershafts in order to equalize the torque received onto the main shaft from each of such countershafts. The movement accurately follows irregularities in the gears and their mounting means whereby the system works well and has received wide commercial acceptance.

In Patent No. 3,237,472, issued Mar. 1, 1966, also assigned to the same assignee as the present application, there is disclosed the utilization of a floating main shaft having improved shaft mounting means together with an output shaft on a fixed axis. This patent was for certain purposes an improvement over the earlier Patent No. 3,105,395 but was not fully satisfactory in that the specific means shown in the earlier patent for supporting the main shaft and/or connecting same to power transmitting means are relatively expensive to manufacture, somewhat awkward in assembly and utilized an appreciable amount of longitudinal space.

In Patent No. 3,335,616, issued Aug. 15, 1967, also assigned to the same assignee as the present application, there is disclosed the utilization of a fixed main shaft rotatably supported at both ends by bearings. Furthermore, the transmission set forth in this patent provides also for an input shaft and the countershafts being supported on fixed axes with the gears thereof being immovable radially with respect to the respective shafts on which they are mounted. The main shaft gears are also here supported on and by the countershaft gears and, when unclutched from the main shaft, said main shaft gears encircle the main shaft with sufficient clearance to permit movement of the gears radially with respect to the main shaft. Thus, the unclutched main shaft gears can move radially with respect to the main shaft but the gear to which the main shaft is clutched is rotatable as a single unit therewih. In his embodiment, however, the means for clutching the gear to the main shaft is floatingly mounted for movement transverse to the main shaft in a plane connecting the axes of two countershafts so that the gear clutched to the main shaft by the floating clutch means will continue to be floatingly oriented with respect to the main shaft in order to equalize the torque received onto the main shaft from each of such countershafts. This system also works well and has received good commercial acceptance.

It is to be noted that in the three above-mentioned patents, the main shaft is supported in a centered position between two countershafts. In Patent No. 3,105,395 and Patent No. 3,237,472, both ends of the main shaft are permitted to float in directions transverse to the plane passing through the axes of two countershafts. The specific means shown in these patents for supporting the main shaft are effective but are relatively expensive to manufacture.

The device shown in Patent No. 3,335,616 which utilizes a main shaft supported for rotation about a fixed axis is also effective but relatively expensive to manufacture due to the provision of floating clutch means on the main shaft. Particularly, the floating cluch means are expensive to manufacture because they must maintain a tolerance which will permit them to float on the main shaft while at the same time which will not result in a sloppy coupling between the main shaft gear and the main shaft.

In an effort to effect further improvements in a transmission of this general type, efforts have been made to provide means diminishing each of the foregoing-named disadvantages and the following described invention is the result.

Accordingly, the objects of this invention include:

(1) To provide a heavy-duty transmission gearing system which utilizes at least two countershafts wherein the power is divided equally therebetween.

(2) To provide a heavy-duty transmission, as aforesaid, which is capable of automatically and continuously dividing the power equally between at least two countershafts whereby to compensate for manufacturing irregularities in the apparatus.

(3) To provide a heavy-duty transmission system, as aforesaid, wherein the two countershafts and gears associated therewith will be identical with each other (other than in some instances in the position of a keyway or other locating devices for the countershaft gears on the countershaft) and thereby effect a system of maximum simplicity in both manufacture, inventorying of parts, and in assembly.

(4) To provide a heavy-duty transmission system, as aforesaid, which can be embodied in transmission parts which are strong and sturdy, which are free from parts requiring delicate adjustment, whose parts will be easily accessible for inspection and/or repair when needed, all toward the end of providing a long period of satisfactory and effective operation at relatively low cost.

(5) To provide mounting means, as aforesaid, for pivotally supporting a shaft to permit one end to move radially in any direction while rotating but at the same time restricting the other end to just rotational movement.

(6) To provide mounting means for a rotatable shaft, as aforesaid, which will be less expensive to manufacture and assemble than the various mounting means and/or gear arrangements for the main shaft shown in Patent Nos. 3,105,395, 3,237,472 and 3,335,616, above mentioned.

Other objects and purposes of the invention will be apparent to persons acquainted with apparatus of this general type upon reading the following disclosure and upon inspection of the accompanying drawings, in which:

FIGURE 5 is a diagrammatic fragment taken on the line V—V of FIGURE 1.

FIGURE 6 is a sectional view taken along the line VI—VI of FIGURE 1 for showing the reverse gearing mechanism.

FIGURE 7 is a fragmentary view of the rear end of the main shaft wherein the gear teeth are crowned.

Figure 1:
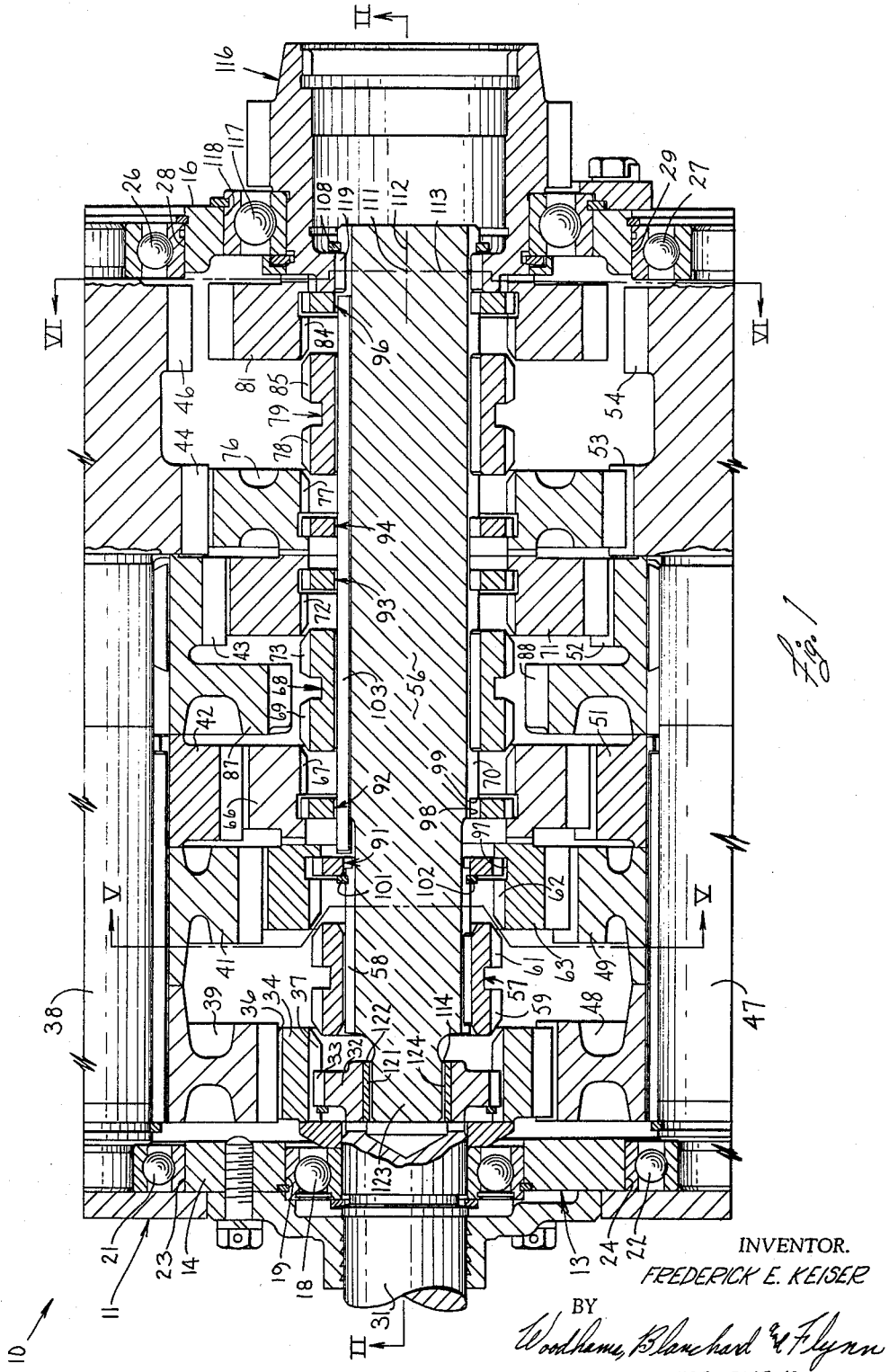
FIGURE 1 is a central sectional view of a transmission embodying the invention.
Figure 2:
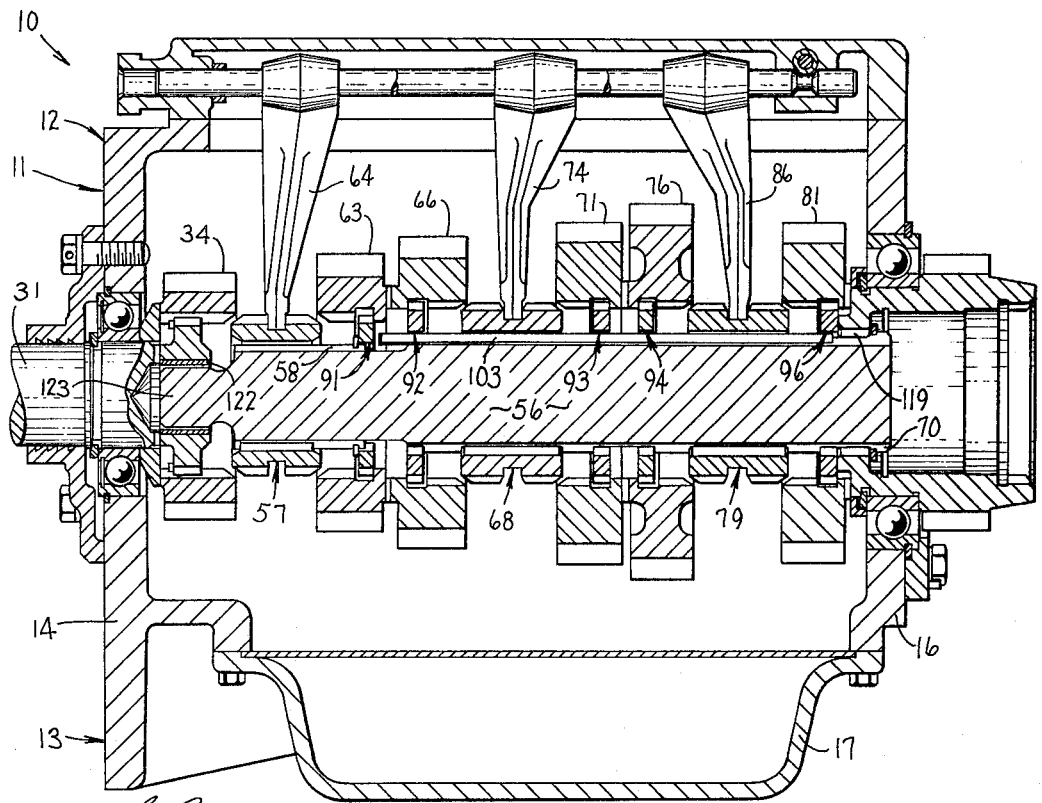
FIGURE 2 is a sectional view taken along the line I—II of FIGURE 1.

In this disclosure, certain terminology will be used for convenience in reference only and will not be limiting. For example, the terms "forward" and "rearward" will refer to directions forward and rearward of the vehicle in which the transmission is installed. Thus, the leftward portion of the transmission as appearing in FIGURES 1 and 2 is forward and the rightward portion as appearing in said figures is rearward. The terms "rightward" and "leftward" will refer to directions as taken in the drawings in connection with which said terminology is used. The terms "inward" and "outward" will refer to directions toward and away from, respectively, the geometric center of the apparatus. All terms mentioned foregoing include all normal derivatives and equivalents of each thereof.

For convenience of identification, the shaft 31 has throughout been called the input shaft, and the shaft 56 has been called the main shaft and the shaft 116 has been called the output unit. This terminology has however, been used for convenience in reference and it is to be given no limiting significance, inasmuch as the apparatus will operate equally well with the direction of power flow reversed.

SUMMARY OF THE INVENTION

The objects and purposes of the invention are met by providing a main shaft which is pivotally supported at one end and is guided at the other end for free floating movement relative to said one end for movement in at least a direction transverse of a plane through the axes of two of the countershafts in a multicountershaft transmission.

DETAILED DESCRIPTION

Referring now to the drawings, there is provided a multicountershaft transmission 10 having a casing 11 which is horizontally split into upper and lower portions 12 and 13, respectively (FIGURE 2). The lower portion 13 has a forward end wall 14 and a rearward end wall 16. A suitable, depending, oil sump 17 may be provided if desired.

Each of said end walls is provided with openings for the reception of the various shaft bearings. The input shaft bearing 18 is supported in a suitable opening 19 in the wall 14. The countershaft bearings 21 and 22 are supported in suitable openings 23 and 24 respectively, in the forward end wall 14 (FIGURE 1). Countershaft bearings 26 and 27 are supported in openings 28 and 29, respectively, in the rearward end wall 16.

An input shaft 31 is supported in the bearing 18 and has an enlarged head 32 formed on the rearward end thereof. The head 32 carries splines 33 and carries thereon the annular drive gear 34. The drive gear 34 has external teeth 36 and internal clutch teeth 37.

A first countershaft 38 is supported by the bearings 21 and 26 and carries thereon and fixed for rotation therewith the countershaft ratio gears 39, 41, 42, 43, 44 and 46.

A second countershaft 47 is supported within the bearings 22 and 27 and is in all respects preferably identical with the first countershaft 38. Second countershaft ratio gears 48, 49, 51, 52, 53 and 54 are mounted on and for rotation with the second countershaft 47 and are preferably respectively identical with the ratio gears 39, 41, 42, 43, 44 and 46, respectively. The countershaft gears 39 and 48 are in constant mesh with the input gear 34.

The main shaft 56 is in this emodiment, and preferably, arranged substantially coaxial with the input shaft 31 and is pivotally supported at the rearward end as hereinafter described in further detail. Gears are provided encircling the main shaft for constant engagement with and support by the countershaft gears and said countershaft gears and/or said main shaft gears are appropriately clutched to each other or to their respective shafts, in any convenient manner to provided driving connections from the two countershafts through a selective pair of said countershaft gears to and through the main shaft gears associated therewith to the main shaft. The particular method of clutching hereinafter described will thus be recognized as illustrative only and not limiting.

In this particular embodiment, the main shaft clutch unit 57 is slidingly mounted on the forward end of the main shaft 56 on splines 58 and carries clutch teeth 59 which are engageable with the clutch teeth 37 on the input gear 34 upon leftward movement of said clutch unit 57. Clutch unit 57 also carries clutch teeth 61 which engage suitable internal clutch teeth 62 in a gear 63 upon rightward movement of the clutch unit 57. The gear 63 is meshed with and carried by the countershaft gears 41 and 49. Said clutch unit 57 is provided with any suitable means for effecting axial movement thereof, such as by the usual grooves and a shift fork 64 (FIGURE 2).

The main shaft gear 66 is supported between and by the countershaft gears 42 and 51 and has a set of internal clutch teeth 67. Clutch unit 68 is slidingly mounted on the splines 70 of the main shaft and is externally toothed at 69 to engage the teeth 67 upon leftward movement of the clutch unit 68 for clutching said gear 66 to the main shaft 56. The gear 71 is supported between and by the countershaft gears 43 and 52 and is provided with internal clutch teeth 72 for engagement with the teeth 73 of the clutch unit 68. Said clutch unit 68 is axially slideable for alternate but only alternate engagement of said gears 66 and 71 and such axial movement is effected in any convenient manner, such as by a conventional shift fork 74 (FIGURE 2). The main shaft gear 76 is supported between and by the countershaft gears 44 and 53 and is provided with internal clutch teeth 77 for engagement with the teeth 78 of a clutch unit 79. The main shaft gear 81 is supported on and between the usual reverse idler gears 82 and 83 (FIGURE 6) which are in turn engaged with the gears 46 and 54, respectively. The gear 81 has internal clutch teeth 84 for engagement with the teeth 85 of the clutch unit 79. The clutch unit 79, like the clutch units 57 and 68, is slidingly mounted on the splines 70 of the main shaft and is actuated by any conventional means, such as a shift fork 86 (FIGURE 2) and to alternately connect the gears 76 and 81 to the main shaft 56. The gears 87 and 88, in this embodiment, on the countershafts 38 and 47, respectively, are power takeoff gears and although they are driven with the respective countershafts, they are not involved in the present invention excepting as a part of the entire apparatus.

Axial movement of the several main shaft gears may be prevented by any convenient and conventional device such as the devices 91, 92, 93, 94 and 96 shown in FIGURES 1 and 2. Referring to the device 91, the same is provided with internal splines interengaging with the external splines 58 on the main shaft 56. The device 91 also has external splines. A groove 97 is cut circumferentially into the internal clutch teeth 62 so that the device 91 can be slid into the groove 97 by the sliding interengagement of the external splines and the teeth 62 to floatingly support the gear 63 relative to the main shaft but held against axial movement. Normal tolerances will permit the device 91 and gear 63 to move axially a little but not enough to interfere with the successful operation of the apparatus. A snap ring 101 is received into a circumferential groove 102 in the main shaft 56 and acts against the leftward facing surface of the device 91 to prevent leftward axial movement of the gear 63 with respect to the shaft 56. It will be noted that the external diameter of the device 91 is sufficiently less than the internal diameter of the groove 97 in the gear 63 that a substantial clearance is provided therebetween in order that the presence of the device 91 will not in any way interfere with movement of the main shaft gears in any radial direction with respect to the main shaft 56. Thus, it should again be emphasized that the gear 63, for example, is in no degree or sense supported on or by the shaft 56 and the device 91 functions only to prevent axial motion of said device or said gear 63 leftwardly as appearing in FIGURES 1 and 2 with respect to the main shaft 56.

For example, the device 92 has internal splines and external splines. The main shaft 56 is provided with a circumferential notch 98 so that the teeth of the internal splines can be moved circumferentially into alignment with the splines 70 on the main shaft 56. A long key 103 is utilized to lock the device 92 to prevent circumferential movement thereof relative to the main shaft 56. The rearward surface 99 of the notch 98 serves to prevent rightward or rearward movement of the device 92 and the gear 66. Leftward movement of the gear is prevented by the presence of the adjacent gear 63. Thus, the gears 63 and 66 hold each other against axial displacement relative to the shaft 56.

The remaining devices 93, 94 and 96 all have similar structure for preventing axial movement of the main shaft gears relative to the main shaft 56 and no further detailing is deemed necessary.

Each of said gears 63, 66, 71, 76 and 81 may be collectively termed "main shaft gears," since they are all capable of drivingly engaging the main shaft. However, it is emphasized that they are all supported on and by the countershaft gears and they merely surround and at times engage the main shaft but are not supported on or by the main shaft. Rather, as will be further developed, the main shaft will move both rotatively and about a pivot axis described in more detail hereinbelow with respect to those of the main shaft gears with which it is not clutched at a particular moment.

Since each of the main shaft gears is constantly engaged with the countershaft gears with which it is supported, engagement or disengagement of a given main shaft gear with the main shaft will not affect its relationship with the countershaft gears upon and by which it is supported.

An output unit 116 is rotatably mounted in a bearing 117 which is in turn fixed in an opening 118 in the rear wall 16 of the transmission casing. As here shown, said output unit 116 is a hollow shaft provided with a conventional means for affixing thereto any suitable driven means, but it will be recognized that it may also be the input gear of an auxiliary transmission arranged serially with respect to the transmission unit herein illustrated and described. The output unit 116 is driven by the main shaft 56 in any convenient manner, such as by the means further hereinafter described. The output unit 116 has internal teeth 119.

Figure 4:
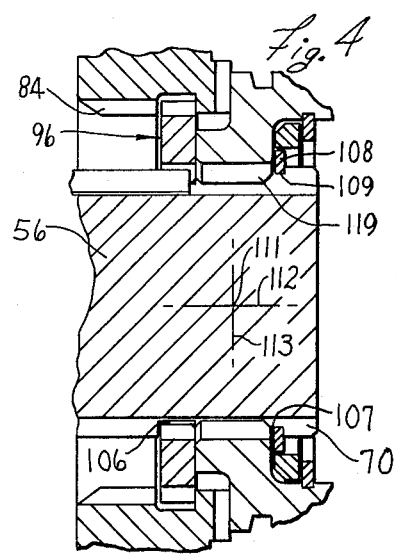
FIGURE 4 is an enlarged showing of the rear end of the main shaft illustrated in FIGURES 1 and 2.

Now turning in more detail to the constructional mounting of the main shaft 56, the splines 70 on the main shaft are in meshing engagement with the internal teeth 119 on the output unit 116. Thus, the rearward end of the main shaft 56 is supported for rotation by the teeth 119 and the bearing 117 to thereby drive the output unit 116. As best illustrated in FIGURE 4, the device 96 is permitted to move axially of the shaft due to the clearance 106 provided therefor between the main shaft 56 and the device 96. A clearance 107 is also provided between a snap ring 108, secured to the shaft 56 in a groove 109, and the rearward face of the internal teeth 119. Thus, the clearances 106 and 107 plus the normal backlash clearance between teeth 119 and splines 70 will permit the main shaft to pivot about a pivot point 111 (FIGURES 1 and 4) located at the theoretical intersection point of the axis 112 of the main shaft with a vertical plane (represented by the reference line 113) through the center of the teeth 119.

It is to be recognized that the main shaft 56 could be pivotally supported by a bearing rather than the teeth construction, with the main shaft extending rearwardly as illustrated in the aforesaid Patent No. 3,335,616. However, an appropriate output unit would be required in order to receive the power from the main shaft without disturbing the pivoted surface thereof.

Figure 3:
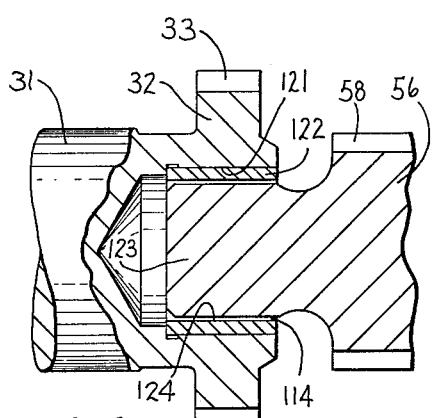
FIGURE 3 is an enlarged showing of the front end of the main shaft illustrated in FIGURES 1 and 2.

The input shaft 31 is provided with a recess 121 (FIGURES 1 and 3) housing a low friction bearing element 122 having a rearwardly facing opening 124 therein. The forward end of the main shaft 56 is provided with a frontwardly extending projection 123 which is received into the opening 124. The clearance 114 between the projection 123 and the low friction bearing 122 is substantially in excess of the normal machining tolerance for similar low friction bearings. For example, in a heavy-duty transmission the normal tolerance for machining the front end of a shaft to enable same to be received into a pilot is typically about .003; in the present case, it is typically from about .028 to .032, about .015 on each radius. Thus, the bearing 122 serves to both permit and provide the limit of radial movement of the forward end of the main shaft 56.

Since the forward end of the main shaft is guided for a free floating relation relative to the rearward end of the main shaft, the clearances around the teeth 119 on the output unit 116 permit the main shaft 56 to pivot about the fixed point 111 between the ends of the main shaft preferably coincident with the axis of the main shaft.

Synchronizers or blocking rings can, if desired, be provided between the interengageable teeth associated with the main shaft 56. However, in the particular embodiment here illustrated, the ratios are as set forth for the main transmission in the previously mentioned patent and the use of synchronizers in the main gear set is accordingly unnecessary.

OPERATION

The operation of the apparatus has been somewhat indicated previously but will be reviewed fully for a better understanding of the invention.

Input power from the shaft 31 is supplied to the input gear 34 and is thence delivered to the countershafts 38 and 47. By suitable manipulation of the shift forks 64, 74 and 86, one of the main shaft gears, such as the gear 63, is engaged with the main shaft, and the power is then conducted from the two countershafts through such gear to the main shaft 56. The power then travels through the main shaft 56 to and through the interengaged portion of the splines 70 and the teeth 119 and thence to the output unit 116.

Turning now to the relationship between the pivoted main shaft of the transmission and the countershaft, it may be stated again that the transmission here shown follows the same general principles as set forth in Patent No. 3,105,395 and that the improvement here in question deals with only the mounting of the main shaft. However, for convenience in reference and to insure a complete understanding of the present invention, the operation of the entire unit will be briefly reviewed.

In this connection, it will be emphasized first that the main shaft has no supporting relationship with the several main shaft gears but is only clutched to such thereof as is desired to be brought into the power train. However, the main shaft gear which in any given instance is clutched with the main shaft will engage same uniformly around the entire circumference of the main shaft and thereby hold it centered in and with respect to said gear. Therefore, since the normal clearance between the teeth 119 and the splines 70 on the main shaft permit a limited but sufficient pivoted movement of the main shaft about the fixed point 111 located between the ends of the main shaft as described hereinabove, any main shaft gear which is clutched to the main shaft will carry the main shaft with it about the pivot point 111 if and as the forward end thereof moves upwardly or downwardly between the countershaft gears with which said clutched main shaft gear is engaged.

The main shaft gears themselves will in their initial assembly be positioned between the countershaft gears associated therewith in such position that their axes are at least approximately in the common plane joining the axes of the countershaft gears. Then, as the given pair of countershaft gears rotate, the main shaft gear associated therewith will normally remain centered inasmuch as its tendency to move off said center in one direction in response to one countershaft gear is counterbalanced by an equal tendency to move in the opposite direction in response to the opposite countershaft gear. In effect, as set forth in more detail in Patent No. 3,105,395, a balanced couple is created by the equal and oppositely directed forces applied to the opposite sides of the main shaft gear. This will be effective inasmuch as both of said countershafts are rigidly locked to a single input shaft and said countershafts are, through said clutched main shaft gear, also rigidly locked to the single output unit 116.

However, if one countershaft gear which for example may be taken as the countershaft gear 41, is irregular in shape, either within itself or as compared to the opposite countershaft gear, it may, if no compensating adjustment is made, tend to develop more pressure due to such irregularity on the associated main shaft gear 63 in an upward direction than is counterbalanced by the downwardly acting pressure from the gear 49. In such case, the load torque on the main shaft gear 63 will move said main shaft gear 63 in a direction opposite to the direction in which it is being driven and thereby restore the balance between the main shaft and the countershaft gears connected thereto. This may be best illustrated by reference to FIGURE 5 wherein there appears a fragment of gear 41, a schematic indication of gear 63, and a fragment of gear 49. The solid line arrows indicate the direction of rotation of each of said gears. The tendency for an increasing pressure between gear 41 and the main shaft gear 63 is indicated by the solid contact between the respective engaged gear teeth at 127 and the tendency for lessening pressure between interengaged teeth of gear 63 and countershaft gear 49 is indicated by the space 128 between adjacent teeth of said last-named gears. The broken line L indicates the load torque which is applied to the main shaft gear 63 by the load which said gear is driving.

It will be apparent from inspection of FIGURE 5 and bearing in mind that gear 63 is permitted to move freely in a vertical direction about the pivot point 111, regardless of the pressure exerted on the gear 63 at the point 127, said load torque will effect a counterclockwise rotation of said gear 63 about the point 127 and thereby move the rightward side of said gear upwardly to the line 129, for example, until the pressure at 128 equals the pressure at 127.

If the tendency toward an unbalance occurs in the opposite direction, then the load torque will move the gear 63 downwardly to bring it again into balance with the adjacent gears 41 and 49.

This movement, and the resulting balancing of forces applied at points 127 and 128 obtained thereby, will occur very rapidly, virtually instantaneously, so that there is no likelihood of any appreciable unbalance occurring between the forces at the opposite contact points 127 and 128. As long as said forces remain equal, and bearing in mind that the gears 41 and 49 are of the same diameter and rotating at the same speed, both the torque and the horsepower transmitted through each of the countershaft gears 41 and 49 will at all times remain equal.

In the foregoing discussion with respect to the operation of the embodiment chosen to illustrate the invention, reference has been made solely to the perpendicular movement of the countershaft gears with respect to a plane through the axes of the countershafts, and this is the movement which is effective in bringing about the proper division of power between the countershafts as above set forth. There will also of course be some sideward movement of the main shaft, as pointed out in Patent No. 3,105,395, but since the normal pressures of the countershaft gears against a main shaft gear in mesh therewith are to urge such main shaft gear respectively away from each of such countershaft gears, the main shaft gear will be balanced between the pair of countershaft gears with which it is associated and same will remain effectively located therebetween.

Thus, the projection 123 will not engage the bearing member 122 with any appreciable amount of pressure and the projection 123 should not be thought of as piloted or supported within the bearing 122 in the usual sense. Instead, as in Patent 3,105,395, the main shaft is supported by the gear to which it may at a given moment be clutched and said gear is in turn supported by the pair of countershaft gears with which it is in mesh. Thus, the weight of the main shaft when any main shaft gear is clutched is carried by the main shaft gear to which it may be clutched and not by the bearing member 122. The function of said bearing member is only to hold said main shaft in an approximately centered position when all of the main shaft gears are unclutched therefrom in order that the clutches 57, 68, and 79 will remain sufficiently centered with respect to the gear splines cooperating therewith that the next following clutching operation may be properly carried out. There is, however, a small restoring force tending to return the main shaft to a centered position. This restoring force is believed to be the result of the reaction torque in the connection between the splines 70 on main shaft 56 and the internal teeth 119 on the output unit 116 tending to cause the shaft 56 to align itself with the output unit 116. This force will also serve to hold the shaft 56 sufficiently centered with respect to the gear splines cooperating with the clutches.

Within the specified limits of the clearance 114 above stated and with normal machining tolerances for gears, the clearance between the teeth 119 and splines 70 will permit the forward end of the main shaft 56 to pivot or float as necessary for satisfactory operation. However, where the tolerances of the gears are such that more clearance is required to permit a greater floating of the forward end of the main shaft, the aforesaid clearance dimensions can be increased beyond the aforesaid limits. However, the coupling between the teeth 119 and the splines 70 will restrict the freedom of movement of the main shaft at the forward end. A crowning of the teeth 119 (FIGURE 7) tends to reduce the magnitude of the restoring force. Therefore, the pivotal movement of the main shaft can be increased by crowning the teeth 119 so that the radius to which the teeth are crowned is greater than the perpendicular distance from the radially outermost point on the splines 70 to the pivot point 111. This construction will permit a greater pivotal movement while at the same time maintaining some degree of restoring force.

It will be observed that in view of the pivoting effect of the main shaft around point 111, there will be a greater capacity for floating movement of said main shaft at the leftward or input end thereof than at the rightward end thereof. While initially this would suggest that the only appreciable corrective or balancing effect would occur near the input end of the shaft and that the gearing at the rightward end (as viewed in FIGURE 1) would need to be made with tolerances substantially approaching if not equaling the tolerances required if the shaft did not float at all, further examination of the system will make it plain that this condition is in fact of no real disadvantage. Reference again to FIG. 5, and the foregoing discussion relating thereto, will show that in effect the main shaft gear pivots for example around the point 128 in accomplishing its correction with respect to the point 127. This is evident inasmuch as the center of said gear moves transversely to the plane connecting the axes of the two countershaft gears. Therefore, it is evident that there will be a larger amount of corrective movement applied to the point 127 for a given center movement of a main shaft gear in a large gear than for the corresponding situation in a small gear. From this it follows that where the entire set of gears is made to the same tolerances, there will be required a larger amount of movement for the center of the main shaft gears in the case of small gears than there is required in the case of larger gears. Since in the transmission design of FIGURE 1 the small gears are placed at the input end of the main shaft and since this is the end of the main shaft which has the greater amount of movement, the requirements of the several gears for corrective movement are properly met. In other words, the larger magnitude of movement required by the smaller gears is provided at the input end of the main shaft by the construction here shown while a smaller amount of corrective movement available at the rightward end of the main shaft is still sufficient for the large gears located adjacent thereto. It is of course necessary that the pivot point 111 be placed at least some distance to the right of the last gear, namely, gear 81 so that at least a slight amount of floating movement is available to said gear. It will of course also be evident that in some extreme cases it may be necessary to make the gear 81 and the gears associated therewith to slightly closer tolerances than is necessary for the remaining gear sets of the gear system. This, however, will normally be necessary only where said pivot point is placed practically within the gear 81 or where unusually large tolerances are utilized for the other gears.

Although particular preferred embodiments of the invention have been disclosed above for illustrative purposes, it will be understood that variations or modifications thereof.

The embodiments of the invention in which an exclusive property or privilege is claimed are defined as follows:

1. In a change gear system having a main shaft, a plurality of countershafts arranged on fixed axes parallel with and substantially symmetrical about said main shaft, a gear encircling and clutchable to the main shaft which gear is adapted for simultaneous meshing with, and support by, gears positioned respectively on each of said countershafts whereby a driving relationship may be established between said countershafts and said main shaft, the improvement comprising:

first means located adjacent one end of said main shaft for pivotally supporting same and second means for guiding the other end of said main shaft in a free floating relation relative to said one end and for movement at least in a direction transverse of a plane through the axes of two of said countershafts.

2. A change gear system according to claim 1, wherein said means pivotally supporting said one end of said main shaft defines a pivot point located at a fixed location between the ends of said main shaft.

3. A change gear system according to claim 2, wherein said pivot point is located adjacent said one end of said main shaft.

4. A change gear system according to claim 3, wherein said one end is the rearward end of said change gear system.

5. A change gear system according to claim 2, wherein said pivot point is located in said plane through the axes of two of said countershafts.

6. A change gear system according to claim 1, wherein said means guiding the other end of said main shaft includes a low friction bearing element; and
    wherein normal machining clearance plus extra clearance is provided between said low friction bearing element and said other end of said shaft to permit a free floating relation of said other end relative to said one end in a direction transverse of said plane through the axes of two of said countershafts.

7. In a change gear system, the combination comprising:
    a plurality of spaced countershafts having parallel axes and means supporting said countershafts for rotation;
    countershaft gears concentrically supported upon said countershafts;
    a rotatable main shaft arranged substantially parallel with said countershafts and located between a pair of said countershafts, means pivotally supporting one end of said main shaft and means guiding the other end of said main shaft in a free floating relation relative to said one end and for movement at least in a direction transverse of a plane through the axes of two of said countershafts;
    a rotatable gear encircling said pivoted shaft and being free to float radially with respect to said pivoted shaft, said rotatable gear being simultaneously meshed with countershaft gears on each of said countershafts and being supported thereby for rotational movement with respect to said pivoted shaft; and
    clutching means for effecting a driving connection between said countershafts and said pivoted shaft through said countershaft and said rotatable gear.

8. A change gear system as defined in claim 7, having a plurality of main shaft gears of varying sizes encircling said main shaft wherein the gears of larger size are adjacent the pivotally supported end of said main shaft and the gears of relatively smaller size are adjacent the free floating end of said main shaft.

9. The change gear system defined in claim 7, wherein the point of pivotal support of said main shaft is between said one end of said main shaft and the main shaft gear nearest thereto.

10. The change gear system defined in claim 7, wherein said one end of said main shaft is provided with a circumferential row of splines; and
    wherein there is further provided an output member supported for rotation on an axis fixed with respect to the axes of said countershafts and having internal splines receiving said splines on said main shaft; and
    wherein clearance is provided between said splines on said output member and said splines on said main shaft to permit angular movement of the axis of said main shaft with respect to the axis of said output member.

11. The change gear system defined in claim 10, wherein said splines on said main shaft are crowned to further enhance the angular movement of the axis of said main shaft with respect to the axis of said output member.

12. A change gear system as defined in claim 7 including input means for simultaneously driving said countershafts in the same direction.

13. The change gear system defined in claim 12, wherein said input means is a driving gear mounted for rotation on an axis fixed and parallel with respect to the axes of said countershafts and meshed with gears on each of said countershafts for simultaneously driving said countershafts in the same direction;

means associated with said input means for supporting a hollow bearing and a portion of said main shaft being received loosely within said hollow bearing;

whereby the axis of said shaft may be normally moved radially with respect to the axis of said hollow bearing but said hollow bearing will limit the extent of such movment to a predetermined magnitude.

References Cited

UNITED STATES PATENTS

| | | | |
|---|---|---|---|
| 3,105,395 | 10/1963 | Perkins | 74—745 |
| 3,237,472 | 1/1966 | Perkins et al. | 74—331 |
| 3,335,616 | 8/1967 | Perkins | 74—331 |

LEONARD H. GERIN, Primary Examiner

U.S. Cl. X.R.

74—357, 359, 410